United States Patent
Pytel (10) Patent No.: US 8,892,440 B2
(45) Date of Patent: Nov. 18, 2014

(54) ELECTRONIC DEVICE AND CONTROL METHOD THEREOF

(75) Inventor: Mariusz Pytel, Piastow (PL)

(73) Assignee: Samsung Electronics Co., Ltd., Suwon-si (KR)

( * ) Notice: Subject to any disclaimer, the term of this patent is extended or adjusted under 35 U.S.C. 154(b) by 304 days.

(21) Appl. No.: 13/108,434

(22) Filed: May 16, 2011

(65) Prior Publication Data

US 2012/0136665 A1 May 31, 2012

(30) Foreign Application Priority Data

Nov. 25, 2010 (KR) ........................ 10-2010-0117907

(51) Int. Cl.
*G10L 13/00* (2006.01)
*G10L 21/00* (2013.01)
*G10L 13/08* (2013.01)
*G10L 15/22* (2006.01)
*G10L 13/047* (2013.01)

(52) U.S. Cl.
CPC .............. *G10L 13/08* (2013.01); *G10L 15/222* (2013.01); *G10L 13/047* (2013.01)
USPC .......................................... 704/258; 704/270

(58) Field of Classification Search
CPC .............................. G10L 15/22; G10L 1/2225
See application file for complete search history.

(56) References Cited

U.S. PATENT DOCUMENTS

| | | | | |
|---|---|---|---|---|
| 4,914,705 A | * | 4/1990 | Nigawara | 704/270 |
| 5,632,002 A | * | 5/1997 | Hashimoto et al. | 704/231 |
| 6,625,257 B1 | * | 9/2003 | Asaoka et al. | 379/88.01 |
| 7,454,351 B2 | * | 11/2008 | Jeschke et al. | 704/275 |
| 7,496,514 B2 | * | 2/2009 | Ross et al. | 704/270 |
| 8,014,498 B2 | * | 9/2011 | Malik | 379/88.13 |
| 8,024,415 B2 | * | 9/2011 | Horvitz et al. | 709/207 |
| 8,374,879 B2 | * | 2/2013 | Falcon et al. | 704/275 |
| 2006/0143012 A1 | * | 6/2006 | Kimura et al. | 704/260 |
| 2010/0063818 A1 | * | 3/2010 | Mason et al. | 704/251 |
| 2011/0301728 A1 | * | 12/2011 | Hamilton et al. | 700/94 |

OTHER PUBLICATIONS

"DTG Usability Text to Speech Subgroup White Paper: Implementation Guidelines and Recommendations for Text-to-Speech v.1.3" Digital TV Group, London, Nov. 2009, pp. 1-12.

* cited by examiner

*Primary Examiner* — Brian Albertalli
(74) *Attorney, Agent, or Firm* — Sughrue Mion, PLLC (57) ABSTRACT

Disclosed are an electronic device and a control method thereof. The electronic device includes a text-to-speech unit which converts a text into an audio signal; an audio output unit which outputs an audio corresponding to the converted audio signal; and a controller which controls the audio output unit to reoutput at least one of audios whose output is not completed if there is at least one audio which is not completely output among a plurality of audios output by the audio output unit.

10 Claims, 6 Drawing Sheets

ELECTRONIC DEVICE AND CONTROL METHOD THEREOF

CROSS-REFERENCE TO RELATED APPLICATION

This application claims priority from Korean Patent Application No. 10-2010-0117907, filed on Nov. 25, 2010 in the Korean Intellectual Property Office, the disclosure of which is incorporated herein by reference.

BACKGROUND

1. Field

Apparatuses and methods consistent with the exemplary embodiments relate to an electronic device and a control method thereof, and more particularly, to an electronic device and a control method thereof which has a text-to-speech function.

2. Description of the Related Art

Figure 1:
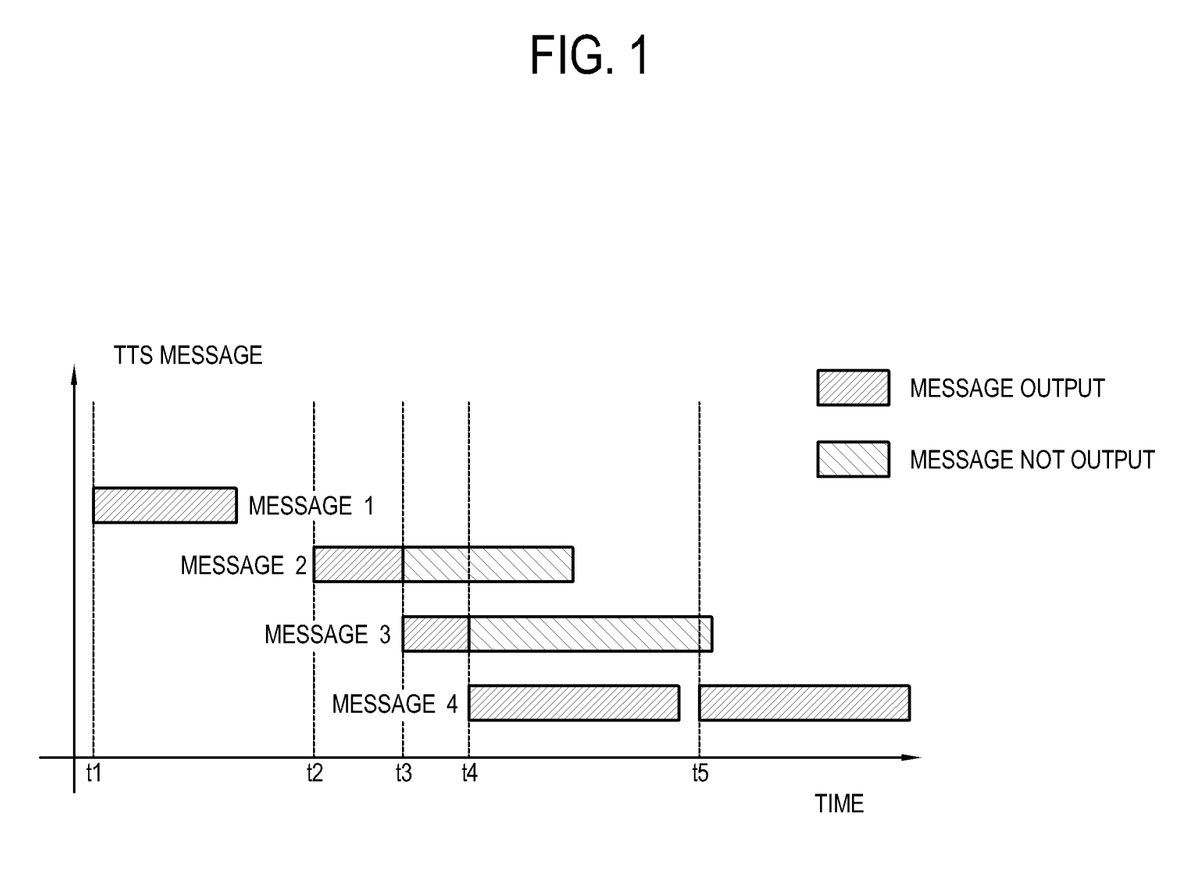
FIG. 1 illustrates a related art text-to-speech system.

A related art Text-to-Speech System may convert a text into an analog audio signal for an output. FIG. 1 illustrates a related art text-to-speech system, in which a TTS message 1 whose output starts at a time t1 is completely output for sufficient time. However, a TTS message 2 whose output starts at a time t2 is not output completely due to a TTS message 3 whose output starts at a time t3. Also, the TTS message 3 is not output completely due to a TTS message 4 whose output starts at a time t4. In the case of the related art text-to-speech system, if a user desires to listen to the completely-output TTS message again, only the latest output TTS message 4 may be output again, and the uncompleted TTS messages 2 and 3 are not output again.

SUMMARY

Accordingly, one or more exemplary embodiments provide an electronic device and a control method thereof which outputs an uncompleted audio again if the uncompleted audio exists due to a plurality of converted audios output by the electronic device which has a text-to-speech function.

According to an exemplary embodiment, an electronic device includes a text-to-speech unit which converts a text into an audio signal, an audio output unit which outputs an audio corresponding to the converted audio signal, and a controller which controls the audio output unit to reoutput at least one of audios whose output is not completed if there is at least one audio which is not completely output among a plurality of audios output by the audio output unit.

The electronic device may further include a storage unit which stores therein a plurality of audios whose output is started by the audio output unit.

The electronic device may further include a user input unit, and the controller may control the audio output unit to reoutput an audio which is navigated and selected by the user input unit among a plurality of audios whose output is not completed.

The audio whose output is not completed may include an audio whose output is not completed due to a start of an output of another audio following the start of the output of the previous audio.

The user input unit may include a key to reoutput the audio.

The electronic device may further include a user input unit, and the controller may control the text-to-speech unit to convert a text corresponding to a user's selection by the user input unit, into an audio signal.

According to another exemplary embodiment, an electronic device includes a text-to-speech unit which converts a text into an audio signal, an audio output unit which outputs an audio corresponding to the converted audio signal, a user input unit, and a controller which controls the audio output unit to delay an output of a second audio until an output of a first audio is completed if a command is received to output the second audio through the user input unit before the output of the first audio is completed by the audio output unit.

The electronic device may further include a storage unit, and the controller may control the storage unit to store therein the second audio for which the output command is received, and control the audio output unit to output the stored second audio if the output of the first audio is completed.

The controller may control the text-to-speech unit to convert a text corresponding to a user's selection by the user input unit into an audio signal.

According to yet another exemplary embodiment, a control method of an electronic device includes converting a text into an audio signal, commencing an output of an audio corresponding to the converted audio signal; and reoutputting at least one audio whose output is not completed if there is at least one audio whose output is not completed among a plurality of audios which is output.

The control method may further include storing the plurality of audios whose output is started.

The reoutputting may include reoutputting an audio which is navigated and selected by the user input unit among a plurality of audios, if there is the plurality of audios whose output is not completed.

The audio whose output is not completed may include an audio whose output is not completed due to a start of an output of another audio following the start of the output of the previous audio.

The converting may include converting a text corresponding to a user's selection by the user input unit into an audio signal.

According to another exemplary embodiment, a control method of an electronic device includes converting a text into an audio signal; commencing an output of a first audio corresponding to the converted audio signal; receiving a command to output a second audio through a user input unit before the output of the first audio is completed; and delaying the output of the second audio until the output of the first audio is completed.

The control method may further include storing the second audio for which the output command is received, and outputting the stored second audio if the output of the first audio is completed.

The converting may include converting a text corresponding to a user's selection by the user input unit into an audio signal.

BRIEF DESCRIPTION OF THE DRAWINGS

The above and/or other aspects will become apparent and more readily appreciated from the following description of the exemplary embodiments, with reference to the accompanying drawings, in which.

DETAILED DESCRIPTION OF EXEMPLARY EMBODIMENTS

Below, exemplary embodiments will now be described in detail with reference to accompanying drawings so as to be realized by a person having ordinary knowledge in the art. The exemplary embodiments may be embodied in various forms without being limited to the exemplary embodiments set forth herein. Descriptions of well-known parts may be omitted for clarity, and like reference numerals refer to like elements throughout.

Figure 2:
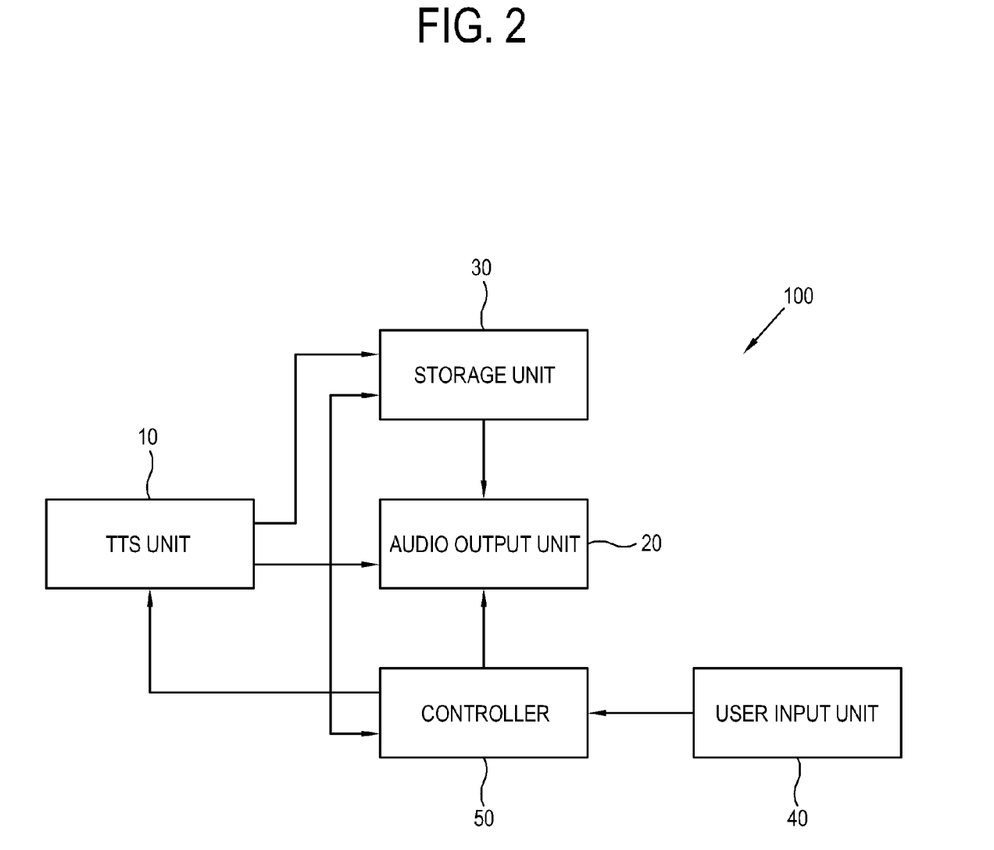
FIG. 2 is a control block diagram of an electronic device according to an exemplary embodiment.

FIG. 2 is a control block diagram of an electronic device according to an exemplary embodiment.

An electronic device 100 includes a text-to-speech (TTS) unit 10, an audio output unit 20, a storage unit 30, a user input unit 40 and a controller 50 which controls the foregoing elements of the electronic device 100.

The electronic device 100 may include any type of electronic devices including a text-to-speech module. Accordingly, the electronic device 100 may include a TV such as a DTV and an IPTV; a personal computer (PC) such as a desktop computer, a laptop computer, and a netbook; or a handheld device such as a mobile phone, a smart phone, a personal digital assistant (PDA) and a portable multimedia player (PMP). However, the exemplary embodiment is not limited thereto, and other structures may be substituted therefore as would be known by those skilled in the art.

The TTS unit 10 includes a TTS module which converts a text (e.g., predetermined) into an audio signal. The TTS module may generate an analog audio signal by analyzing the text; generating a rhythm of the analyzed text; and synthesizing the generated rhythms. The text may include a text in Korean, Chinese, Japanese and any other languages.

The text which may be converted into an audio by the TTS unit 10 may include a user selection menu provided for a user's selection, and any information which may be provided to a user through the electronic device 100. For example, if the electronic device 100 includes a TV, the text which may be converted into an audio by the TTS unit 10 may include menus provided from the TV; the type and number of menus provided, and a selected menu item; an electronic program guide (EPG); and information on a displayed content. If the content includes a broadcasting program, the information may include a title of the program, a channel number or the like.

The TTS unit 10 may convert a text into an audio signal corresponding to a user's selection by the user input unit 40. Accordingly, among the information which may be converted into an audio, the TTS unit 10 may convert a text into an audio signal corresponding to the item selected by a user through the user input unit 40. For example, if a user inputs a selection for EPG information through the user input unit 40, the text corresponding to the EPG information may be converted into an audio signal.

The audio output unit 20 may output an audio corresponding to the audio signal converted by the TTS unit 10. For example, the audio output unit 20 may include a speaker.

The storage unit 30 may store therein a plurality of audios whose output is started by the audio output unit 20. Accordingly, if the output of the audio is started by the audio output unit 20, the audio whose output is not completed may also be stored. Even if the output of the audio is not started by the audio output unit 20, all of the audios whose conversion is completed by the TTS unit 10 may also be stored.

The user input unit 40 is used to input a user's selection. The user input unit 40 may include a key (e.g., particular) corresponding to a user's selection requiring a re-output of the audio. Accordingly, corresponding to the signal of the particular key, the controller 50 may reoutput the audio whose output is not completed. If there is a plurality of audios whose output is not completed by the audio output unit 20, a user may input the key several times, and navigate and select an audio to be reoutput among the plurality of audios. Alternatively, the user input unit 40 may include a navigation key to navigate an audio to be reoutput among the plurality of audios. The navigation key may include a previous button and/or a next button to enable the navigation of the audio to be reoutput among the plurality of audios.

The user input unit 40 may vary in structure as long as it is used to input a user's selection. The user input unit 40 may be provided as a physical key in a panel of the electronic device 100 or a touch panel or a touch screen, or a remote controller which may communicate with the electronic device 100 in a wired/wireless manner or a keyboard. However, other structures may be substituted therefore as would be understood by those skilled in the art.

If there is any audio which is not output completely among the plurality of audios output through the audio output unit 20, the controller 50 may control the audio output unit 20 to reoutput at least one of audios which is not output completely. If there is a plurality of audios whose output is not completed, the controller 50 may control the audio output unit 20 to reoutput the audio which is navigated and selected by the user input unit 40 among the plurality of audios.

The audio whose output is not completed means an audio which is converted by the TTS unit 10 and whose output is started by the audio output unit 20 but not completed due to an interrupt. For example, the interrupt includes a start of an output of a second audio before a first audio is not output completely, but not limited thereto. The interrupt may further include a physical error of the electronic device 100 by which the audio is not completely output.

According to another exemplary embodiment, upon receiving a command to output a second audio through the user input unit 40 before the output of a first audio is completed through the audio output unit 20, the controller 50 may control the audio output unit 20 to delay the output of the second audio until the output of the first audio is completed. The controller 50 may control the storage unit 30 to store therein the second audio for which the output command is received, and may control the audio output unit 20 to output the stored second audio if the output of the first audio is completed.

A control operation of the controller 50 is described with reference to FIGS. 3 and 4.

Figure 3:
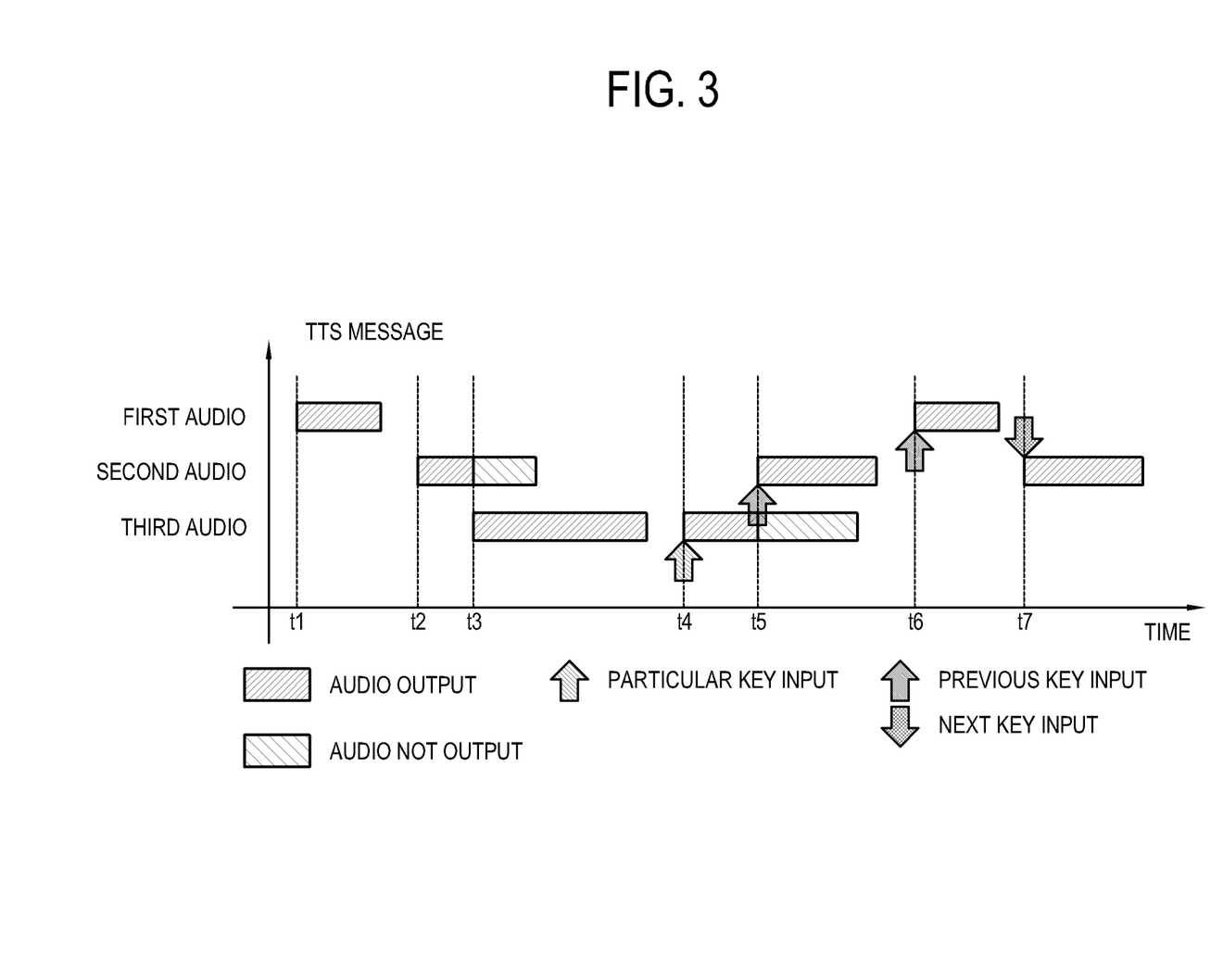
FIG. 3 illustrates an example of a text-to-speech system of an electronic device according to a first exemplary embodiment.

FIG. 3 illustrates an example of a text-to-speech system of an electronic device according to a first exemplary embodiment.

If a user's first selection is input through the user input unit 40, a text corresponding to the user's first selection is converted into an audio signal by the TTS unit 10 and transmitted to the audio output unit 20. The audio output unit 20 starts an output of a first audio at a time t1 corresponding to the received audio signal, and completes the output in a time (e.g., predetermined). If a user's second selection is input through the user input unit 40, a text corresponding to the user's second selection is converted into an audio signal by the TTS unit 10. The audio output unit 30 starts an output of the second audio at a time t2. However, if a user's third selection is input through the user input unit 40 before the output of the second audio is completed, the audio output unit 30 which receives the corresponding audio signal, suspends the output of the second audio and starts an output of a third audio at a time t3. Then, the output of the second audio is not completed, and a user cannot listen to the entire second audio.

In a related art text-to-speech system, if a user presses a repeat button to listen to the output audio again, only the latest output audio is output again. Thus, only the third audio is repeated and a user may not listen to the second audio which he/she did not listen to.

According to this exemplary embodiment, the controller 50 of the electronic device 100 controls the storage unit 30 to store all of the audios whose output is started by the audio output unit 20. If a key (e.g., particular) is input to select the reoutput of the audio through the user input unit 40 after the third audio is output, the controller 50 may output the second audio stored in the storage unit 30.

If a key (e.g., particular) is input at a time t4 to select the reoutput of the audio through the user input unit 40, the third audio which was output most recently is output again, and upon the input of the key once again at a time t5, the second audio which was output before the third audio is output again. Accordingly, a user may listen to the second audio which he/she did not listen to due to the uncompleted output. If the key is input once again at a time t6, the first audio which was output before the second audio is output again.

The user input unit 40 may include a previous input and a next input to navigate an audio to be reoutput among a plurality of audios whose output is not completed. Then, if the particular key is input at a time t4, the third audio is output, and upon the input of the previous key at a time t5, the second audio which was output before the third audio is output. If the previous key is input once again at a time t6, the first audio which was output before the second audio is output. If the next key is input at a time t7, the second audio which was output following the first audio is output. Then, a user may navigate a desired audio and select the reoutput of the desired audio as many times as he/she wants, among the plurality of audios which was output through the audio output unit 20.

Figure 4:
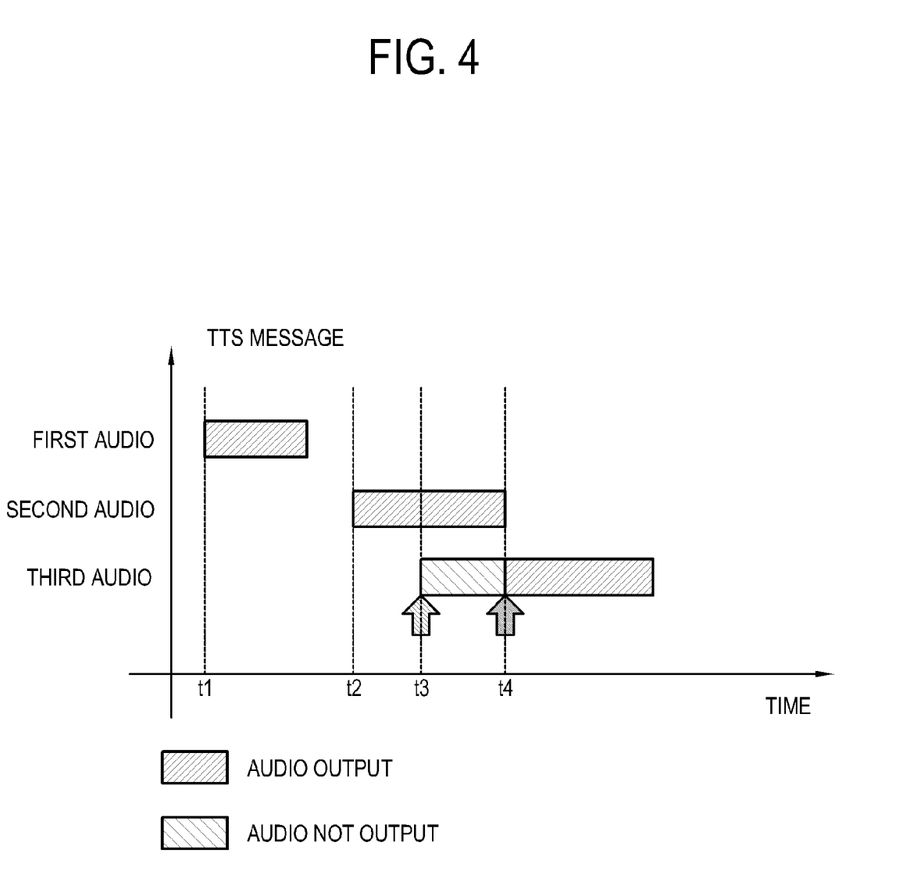
FIG. 4 illustrates an example of a text-to-speech system of an electronic device according to a second exemplary embodiment.

FIG. 4 illustrates an example of a text-to-speech system of an electronic device according to a second exemplary embodiment.

If a user's first selection is input through the user input unit 40, a text corresponding to the user's first selection is converted into an audio signal by the TTS unit 10 and transmitted to the audio output unit 20. The audio output unit 20 starts an output of a first audio at a time t1 corresponding to the received audio signal, and completes the output in a time (e.g., predetermined). Upon receiving a command to output a third audio corresponding to a user's third selection through the user input unit 40 before a second audio is completely output at a time t2, the controller 50 may delay the output of the third audio until the time when the output of the second audio is completed. Accordingly, the second audio is output completely without suspension at the time t3. The controller 50 may store the delayed third audio in the storage unit 30, and output the stored third audio at the time (t4) when the output of the second audio is completed. Then, a user may listen to any audio without interruption.

According to this exemplary embodiment, a user may navigate and reoutput one of the first to third audios which he/she already listened to, to listen to a desired audio as many times as he/she wants.

Figure 5:
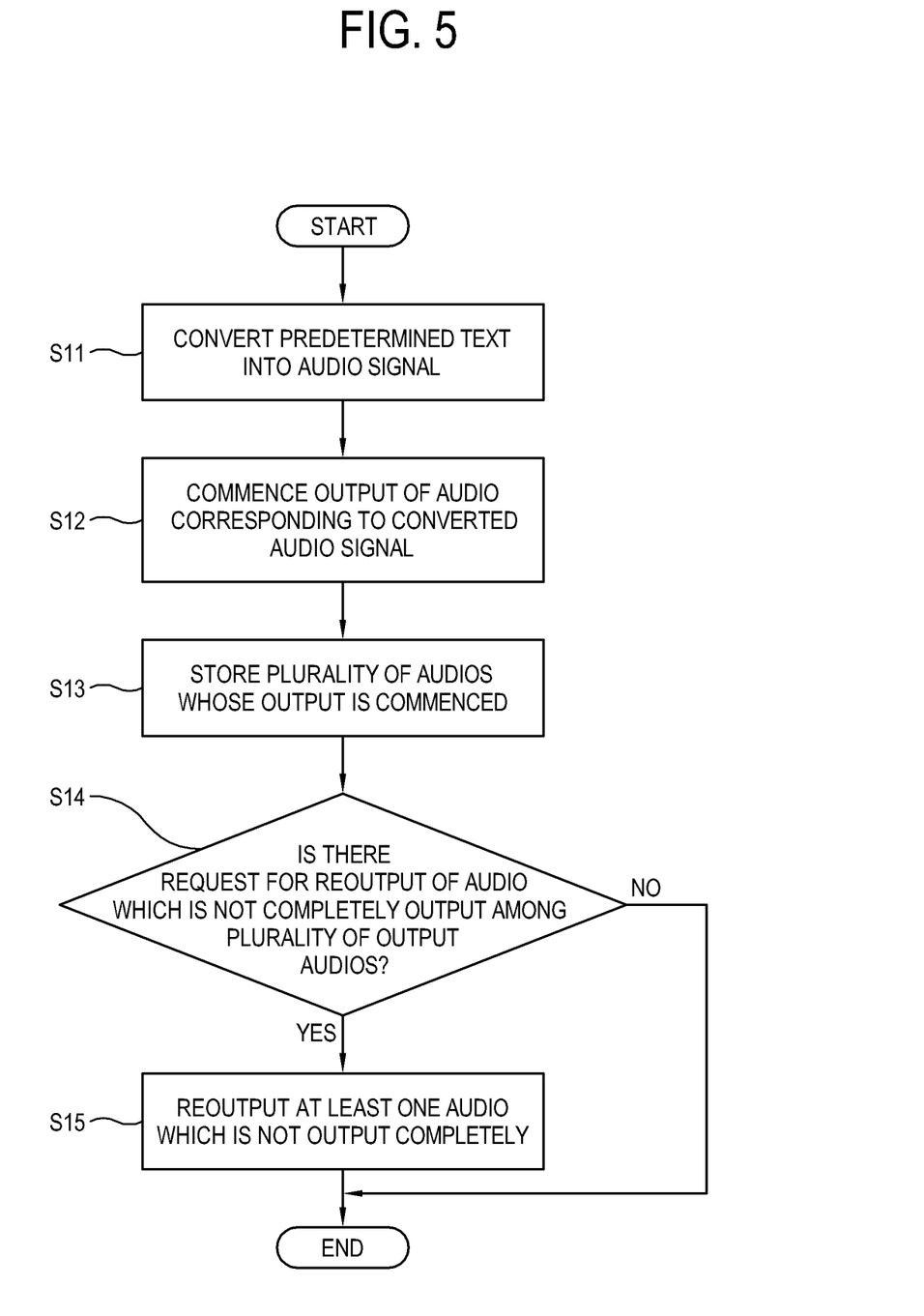
FIG. 5 is a control flowchart of the electronic device according to the first exemplary embodiment.

FIG. 5 is a control flowchart of the electronic device according to the first exemplary embodiment.

A text (e.g., predetermined) is converted into an audio signal by the TTS unit 10 (S11). The text which corresponds to the user's selection by the user input unit 40 may be converted into the audio signal. The output of the audio which corresponds to the audio signal converted by the TTS unit 10 is started by the audio output unit 20 (S12). The plurality of audios whose output is started is stored (S13). It is determined whether there is a request for reoutput of audio which is not completely output among the plurality of output audios (S14). If so, at least one of the audios whose output was not completed among the plurality of audios is reoutput upon a request for the reoutput through the user input unit 40 (S15).

If there is a plurality of audios whose output was not completed, the reoutput of the audio includes a reoutput of the audio navigated and selected by the user input unit 40 among the plurality of audios.

Figure 6:
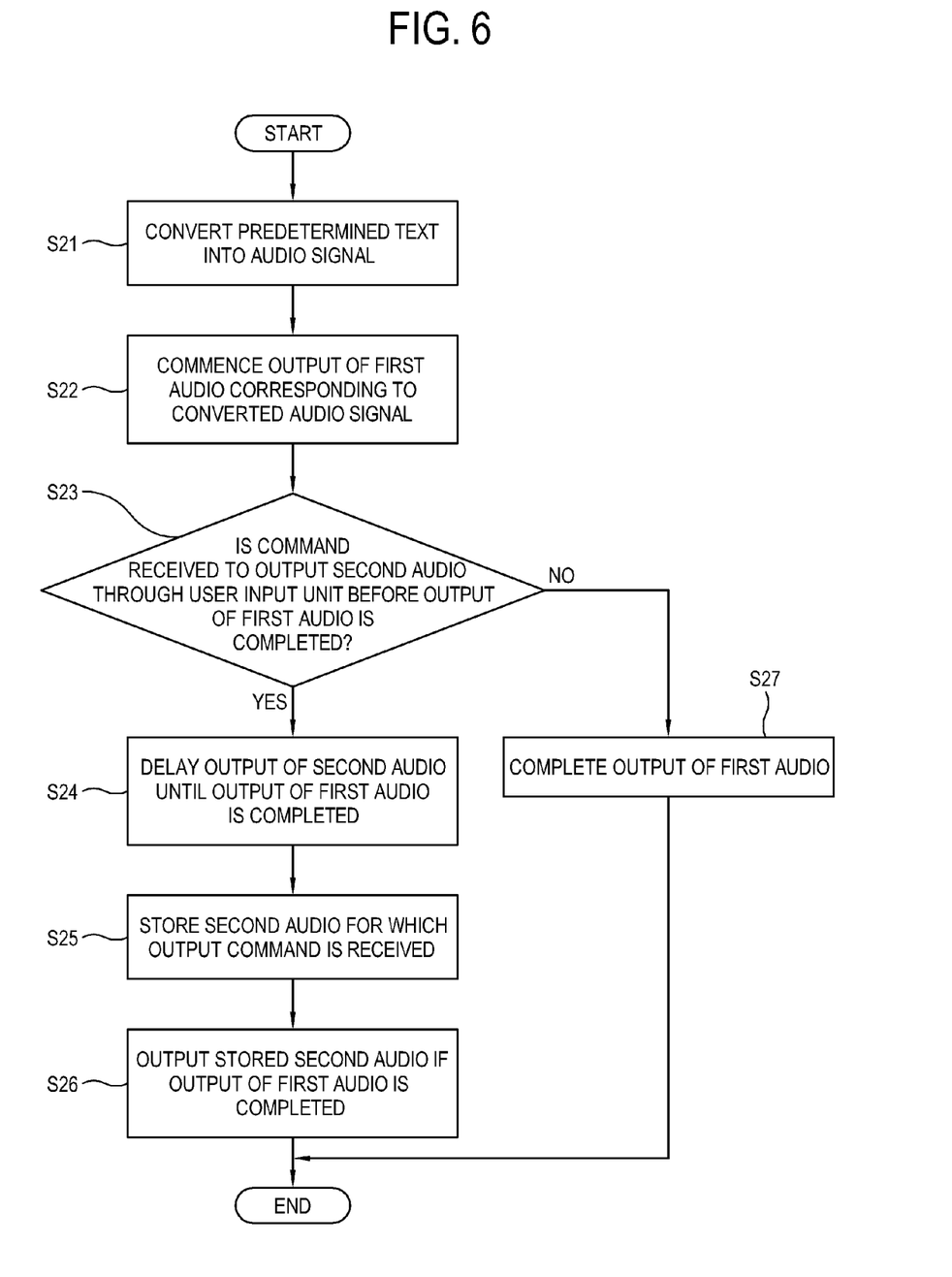
FIG. 6 is a control flowchart of the electronic device according to the second exemplary embodiment.

FIG. 6 is a control flowchart of the electronic device according to the second exemplary embodiment.

A text (e.g., predetermined) is converted into an audio signal by the TTS unit 10 (S21). The text which corresponds to the user's selection by the user input unit 40 may be converted into the audio signal. The output of the first audio which corresponds to the audio signal converted by the TTS unit 10 is started by the audio output unit 20 (S22). It is determined whether the command to output the second audio through the user input unit 40 is received before the output of the first audio is completed (S23). If so, the controller 50 delays the output of the second audio until the output of the first audio is completed (S24). The controller 50 stores the second audio for which the output command is received (S25), and outputs the stored second audio upon the completion of the output of the first audio (S26).

At operation S23, if the command is not received to output the second audio through the user input unit 40 before the output of the first audio is completed, the output of the first audio is completed (S27).

As described above, an electronic device and a control method thereof according to the inventive concept re-outputs an audio whose output is not completed due to a plurality of output audios converted from a text.

The above-described exemplary embodiments can also be embodied as computer readable codes which are stored on a computer readable recording medium (for example, non-transitory, or transitory) and executed by a computer or processor. The computer readable recording medium is any data storage device that can store data which can be thereafter read by a computer system, including the video apparatus.

Examples of the computer readable recording medium include read-only memory (ROM), random-access memory (RAM), CD-ROMs, magnetic tapes, floppy disks, optical data storage devices, and carrier waves such as data transmission through the Internet. The computer readable recording medium can also be distributed over network coupled computer systems so that the computer readable code is stored and executed in a distributed fashion. Also, functional programs, codes, and code segments for accomplishing the embodiments can be construed by programmers skilled in the art to which the disclosure pertains.

It will be understood that various modifications may be made. For example, suitable results may be achieved if the described techniques are performed in a different order and/or if components in a described system, architecture, device, or circuit are combined in a different manner and/or replaced or supplemented by other components or their equivalents.

Although the foregoing exemplary embodiments have been shown and described, it will be appreciated by those skilled in the art that changes may be made in these exemplary embodiments without departing from the principles and spirit of the inventive concept as defined by the following claims, the range of which is defined in the appended claims and their equivalents.

What is claimed is:

1. An electronic device comprising:
   a text-to-speech unit configured to convert a text into an audio signal;
   an audio output unit that outputs an audio corresponding to the audio signal converted by the text-to-speech unit;
   a controller that controls the audio output unit to reoutput the audio if output of the audio has not been completed, wherein the audio is one of a plurality of audios for which output has started;
   a user input unit, wherein the controller controls the audio output unit to reoutput the audio based on a selection received by the user input unit; and
   a storage unit which stores the plurality of audios whose output is commenced.

2. The electronic device according to claim 1, wherein one of the plurality of audios whose output has not been completed comprises a first audio whose output has not been completed due to a start of a subsequent output of a second audio following the start of the output of the first audio.

3. The electronic device according to claim 2, wherein the user input unit comprises a key to reoutput the one of the plurality of audios.

4. The electronic device according to claim 1,
   wherein the controller controls the text-to-speech unit to convert the text corresponding to a selection by the user input unit into the audio signal.

5. A control method of an electronic device comprising:
   converting a text into an audio signal;
   commencing output of an audio corresponding to the converted audio signal;
   storing the audio after the output has commenced;
   receiving a selection from a user input unit to reoutput the audio if the output of the audio has not been completed; and
   reoutputting the audio based on the user selection if the output of the audio has not been completed,
   wherein the audio is one of a plurality of audios for which output has started.

6. The control method according to claim 5, wherein the reoutputting comprises reoutputting the audio based on an input that selects the audio from among the plurality of audios whose output has started but has not been completed.

7. The control method according to claim 6, wherein the audio comprises a first audio whose output is started but not completed due to a start of an output of a second audio following the start but prior to completion of the output of the first audio.

8. The control method according to claim 5, wherein the converting comprises converting the text corresponding to a selection into the audio signal.

9. A device, comprising:
   an output device that outputs an audio;
   a storage unit that stores the audio after the output has commenced; and
   a controller that controls the output unit to reoutput the audio if the output of the audio has not been completed and an output of another audio has started, based on a selection received from a user input unit to reoutput the audio.

10. A non-transitory computer readable information medium containing instructions for controlling a device, the instructions comprising:
    commencing output of a first audio;
    storing the first audio after the output has commenced; and
    reoutputting the first audio if the output of the audio has not been completed and output of a second audio has started based on a selection received from a user input unit to reoutput the audio.

* * * * *